United States Patent [19] [11] 4,105,839
Koyanagi et al. [45] Aug. 8, 1978

[54] METHOD FOR POLYMERIZING ETHYLENICALLY UNSATURATED MONOMERS IN ORDER TO ELIMINATE POLYMER DEPOSITION

[75] Inventors: Shunichi Koyanagi; Hajime Kitamura; Toshihide Shimizu; Kenji Fushimi, all of Joetsu, Japan

[73] Assignee: Shin-Etsu Chemical Co., Ltd., Tokyo, Japan

[21] Appl. No.: 713,894

[22] Filed: Aug. 12, 1976

[30] Foreign Application Priority Data

Aug. 14, 1975 [JP] Japan .................................. 50-98784

[51] Int. Cl.$^2$ ............................. C08F 2/16; C08F 2/00
[52] U.S. Cl. ................................ 526/62; 260/880 R; 526/72; 526/91; 526/93; 526/319; 526/328; 526/340; 526/341; 526/343; 526/346
[58] Field of Search .................... 526/74, 62, 204, 205, 526/211, 217, 218, 219, 225, 344, 345, 880 R

[56] References Cited

U.S. PATENT DOCUMENTS

| 3,661,867 | 5/1972 | Koyanagi | 526/344 X |
| 3,669,946 | 6/1972 | Koyanagi | 526/344 X |
| 3,959,235 | 5/1976 | Nishigaki | 526/62 |
| 3,962,196 | 6/1976 | Weimer | 526/74 |

Primary Examiner—Christopher A. Henderson, Jr.
Attorney, Agent, or Firm—Bierman & Bierman

[57] ABSTRACT

In the polymerization of at least one ethylenically unsaturated monomer other than vinyl chloride, deposition of polymer scale on the inner walls of a polymerization reactor and other surfaces coming into contact with the monomer is effectively prevented (regardless of the type of polymerization used, so long as it takes place in a heterogeneous phase) by coating the surfaces of the reactor with at least one compound selected from organic electron donor compounds and organic electron-acceptor compounds prior to polymerization, the compound or compounds having been or being brought into contact with an oxidizing agent, a reducing agent, an acid or a base, or having been or being irradiated with ultraviolet light.

13 Claims, No Drawings

METHOD FOR POLYMERIZING ETHYLENICALLY UNSATURATED MONOMERS IN ORDER TO ELIMINATE POLYMER DEPOSITION

This application claims the priority of Japanese application No. 98784/50 filed Aug. 14, 1975.

BACKGROUND OF THE INVENTION

This invention relates to an improved method for the polymerization of ethylenically unsaturated monomers; and more particularly, to a method for the polymerization of one or more ethylenically unsaturated monomers, other than vinyl chloride, in a heterogeneous phase which is free from the problems of polymer scale deposition.

Heterogeneous polymerization, such as suspension or emulsion polymerization, in an aqueous medium is widely employed for the preparation of a variety of synthetic resins, including polystyrene, polyacrylonitrile, acrylonitrile-butadiene-styrene copolymer, styrene-butadiene copolymer and other synthetic rubbers. The heterogeneous polymerization methods in an aqueous medium are of industrial importance, but usually suffer from polymer scale deposition on the various surfaces in contact with the monomer within the polymerization reactor.

In practice, the inner walls of the polymerization reactor and the surfaces of the agitator and other equipment installed within the polymerization reactor are contacted by the monomer or monomers during a polymerization run and become covered with polymer scale. This results in a decrease in the yield of polymer product as well as in the cooling capacity - and hence the production efficiency - of the reactor. Moreover, the polymer scale may eventually come off the reactor surfaces and enter the polymer product, thereby causing degradation of its quality. Furthermore, the removal of polymer scale after each polymerization run not only requires extensive time and labor, but also causes health problems to workers in view of the toxicity of unreacted monomer or monomers absorbed in the polymer scale. This health hazard has been one of the most serious environmental issues in recent times.

A number of methods have been proposed for the prevention of polymer scale deposition, specifically in the suspension polymerization of vinyl chloride or a monomer mixture composed mainly of vinyl chloride. For example, the alkaline substance is added to an aqueous polymerization medium so that the aqueous medium will have a pH higher than 8.0. In another example, an inorganic oxidizing agent is added to the aqueous medium. In still another example, the inner walls of a polymerization reactor are coated with an organic polar compound or an organic dye before the polymerization run is started. These prior art methods have, in fact, been successful in some cases for the commercial production of polyvinyl chloride resins, but have certain disadvantages.

The method wherein an alkaline substance or inorganic oxidizing agent is added to the reaction mixture not suitable for the polymerization of certain ethylenically unsaturated monomers; such as vinyl esters, esters of acrylic and methacrylic acids and diene compounds, since such addition tends to decompose or oxidize those monomers. Further, the method wherein the polymerization reactor walls are coated exhibits a decrease in polymer scale prevention and a decrease in the duration of this effect, when the polymerization is carried out with an emulsifier added to the aqueous polymerization medium; when the copolymerization of a conjugated diene monomer and a vinyl monomer is intended; or when the polymerization is carried out in the presence of an acyl peroxide (such as benzoyl peroxide or lauroyl peroxide); a higher carboxylic acid (such as stearic acid, an ester or a salt thereof); or a molecular weight controlling agent, such as mercaptans. Thus, it is a generally accepted conclusion that the prior art methods can be satisfactorily used only in the suspension polymerization of vinyl chloride in an aqueous medium of the most simplified. Such a formulation contains a nonionic, polymeric dispersing agent which is free of unsaturations; e.g. partially saponified polyvinyl alcohol or methyl cellulose.

SUMMARY OF THE INVENTION

The object of the present invention is to provide a novel and improved method for the polymerization of an ethylenically unsaturated monomer or monomers other than vinyl chloride, which is free from the disadvantages encountered in the prior art techniques for the prevention of polymer scale deposition on the various surfaces in contact with the monomer or monomers within the polymerization reactor.

In accordance with the method of the present invention, the surfaces of the parts of the polymerization reactor coming into contact with the monomer or monomers are coated prior to the polymerization run with at least one compound selected from the group consisting of organic electron donor compounds (A) and organic electron acceptor compounds (B); the compound or compounds having been or being brought into contact with at least one compound (C) selected from the group consisting of oxidizing agents, reducing agents, acids and bases, or having been or being irradiated with ultraviolet light.

The effect of the above method can be further enhanced by adding to the polymerization mixture the product obtained by the reaction of compounds (A) and/or (B) with compound (C) or by irradiation of compounds (A) and/or (B) with ultraviolet light in an amount of from 5 to 100 p.p.m. by weight based on the monomer or monomers.

The method of the present invention is effective in any type of polymerization involving ethylenically unsaturated monomer or monomers other than vinyl chloride. The mechanism of free radical initiation prevents polymer scale deposition on the inner walls of the polymerization reactor and other surfaces in contact with the monomer or monomers. In other words, the present invention offers a method of polymerizing any of the ethylenically unsaturated monomers (except vinyl chloride), such as vinyl esters, e.g., vinyl acetate and vinyl propionate; acrylic and methacrylic acids and esters thereof; acrylonitrile; and conjugated diene monomers, e.g., butadiene, chloroprene and isoprene, without the problem of polymer scale deposition. The method the present invention is especially effective in free radical initiated polymerization in a heterogeneous phase, including suspension or pearl polymerization and emulsion polymerization as well as bulk or solution polymerization, in which the polymer formed precipitates in the polymerization mixture. Further, the method of the present invention can be advantageously employed in the preparation of polystyrene, polymethyl methacrylate and polyacrylonitrile by pearl polymerization or emulsion polymerization; synthetic rubber latexes such as styrene-butadiene rubber, acrylonitrilebutadiene rubber, chloroprene rubber and isoprene rubber, by emulsion polymerization, and ABS polymers and polymers of vinyl halides other than vinyl chloride by emulsion polymerization or suspension polymerization. Furthermore, an advantage of the method of the present invention is that its effect is not reduced by the use of conventional additives, such as molecular weight controlling agents, pH adjustment agents and various stabilizers and lubricants, in the polymerization mixture.

DETAILED DESCRIPTION OF THE PREFERRED EMBODIMENTS

The organic electron donor compounds useful as compound (A) in the present invention include those compounds defined as Lewis bases with, preferably from the standpoint of practice, a strong adsorptivity to the surfaces to be treated. Illustrative of the organic electron donor compounds are aromatic polycyclic hydrocarbons, such as naphthalene, anthracene, phenanthrene, fluoracene, pyrene, azulene, fluorene, diphenyl, triphenylmethane, naphthacene and chrysene; polyene compounds with more than two double bonds, such as β-carotene; nitrogen-containing organic compounds which are amine or azo compounds, such as aminonaphthalene, diaminonaphthalene, diphenylamine, phenazine, carbazole, acridine, o-phenanthroline, higher aliphatic amines, benzidine, azobenzene and hydrazobenzene; sulfur-containing organic compounds, such as thiazine or thiazole compounds (e.g., phenothiazine, dibenzophenothiazine and mercaptobenzothiazole), higher aliphatic mercaptans, higher aliphatic thioethers, diphenylthioether, diphenylthiourea, sulfides and polysulfides; oxygen-containing organic compounds, such as oxazine compounds (e.g., phenoxazine, diphenylene oxide and ethers); basic quinoneimine dyes having azine, oxazine or thiazine rings, such as Methylene Blue, Safranine, Nigrosine Base, Spirit Black, Induline, Nile Blue A and Aniline Black; basic azo dyes having a monoazo, diazo or polyazo structure, such as Bismarck Brown R and Yellow AB; diphenylmethane dyes, such as Auramine JD; triphenylmethane dyes, such as Sudan Black B, Oil Scarlet SN and Oil Yellow; xanthene dyes, such as Rhodamine B; and other dyes and pigments having electron donating groups, such as thiazole dyes, phthalocyanine dyes and cyanine dyes.

The organic electron acceptor compounds useful as compound (B) in the present invention include those compounds defined as Lewis acids with, preferably, a strong adsorptivity to the surfaces to be treated. Illustrative of the organic electron acceptor compounds are quinone compounds, such as naphthoquinone, anthraquinone, diphenoquinone and polyporic acid; organic sulfonic acids, such as α-naphthalenesulfonic acid, anthraquinonesulfonic acid, dodecylbenzenesulfonic acid and metanilic acid and sodium, potassium and ammonium salts thereof; aromatic polycyclic compounds, such as halogen substituted chloronaphthalenes and chloroanthracenes; carboxylic acids, such as 3-oxy-2-naphthoic acid, naphthalic acid and diphenylic acid, and anhydrides or sodium, potassium and ammonium salts thereof; nitro compounds, such as α-nitronaphthalene; cyano compounds, such as α-cyanonaphthalene; esters of phosphoric acid and polyphosphoric acids, such as esters of monolaurylphosphoric acid, sorbitan esters of hexametaphosphoric acid, polyoxyethylenesorbitan esters of triphosphoric acid and phytic acid and sodium, potassium and ammonium salts thereof; acid azo dyes having a monoazo, diazo or polyazo structure, such as α-Naphthol Orange, Amaranth, Acid Brown GR, Acid Light Yellow and Milling Black VLG; acid mordant dyes, such as Chrome Black PB; direct azo dyes, such as Direct Brown M, Congo Red and Direct Blue; anthraquinone mordant dyes, such as Alizarine; acid anthraquinone dyes, such as Anthraquinone Violet JD; anthraquinone vat dyes, such as Indanthrene; other threne and anthraquinone dyes; Indanthrene ID-6GD; naphtoquinone or benzoquinone vat dyes, such as Mikezin Brown CRD; indigosol or anthrasol dyes; indigo dyes, such as Brilliant Tsuya Indigo B; nitro dyes, such as Naphthol Yellow S; nitroso dyes; sulfide dyes; acid triphenylmethane dyes, such as Acid Milling Green J and Acid Violet 4BN; acid quinoneimine dyes having an azine, thiazine or oxazine ring, such as Nigrosine and Brilliant Alizarin Blue 3K; oil soluble azo dyes, such as Solar Brown RKX, Oil Red RR, Oil Red SA, Oil Scarlet 308 and Vali Fast Black 3804; oil soluble xanthene dyes, such as Rhodamine B Base; reactive dyes, such as Brilliant Orange GS and Brilliant Blue RS; quinoline dyes; and other organic dyes having acid groups or electron accepting groups, such as xylene Fast Yellow 2G (pyrazolone dye) and Diaresin Rose BD (thiazole dye).

Further, illustrative of the oxidizing agents, reducing agents, acids or bases useful as compound (C) in the present invention are (a) reducing or basic organic compounds, such as nitrogen-containing aromatic compounds (e.g., aniline, o-toluidine, pyridine, morpholine, nicotin, 8-hydroquinoline, indole, skatole, pyrimidine and piperazine); aliphatic amines (e.g., ethylamine, diethylamine, triethylamine, ethylenediamine, guanidine, hydrazine derivatives, trimethylene diamine and hexamethylene diamine); alkanolamines; sulfur-containing organic compounds (e.g., thiocresol, thiophenol, thiourea, lower aliphatic thioethers and mercaptans); reducing carbohydrates and related compounds (e.g., glucose, maltose, mannitol and L-ascorbic acid); and oxygen-containing organic compounds (e.g., aldehydes including rongalit, formaldehyde, acetaldehyde and furfural); esters (e.g., epichlorohydrine), and phenolic compounds (e.g., hydroquinone, phenol, 4-chlorophenol, pyrogallol and pyrocatechol);

(b) oxidative or acidic organic compounds, such as aromatic nitro compounds (e.g., trinitrobenzene, picrylazide and picric acid); p-benzoquinone and substituted benzoquinone compounds (e.g., chloranil and fluoranil); organic peroxides (e.g., benzoyl peroxide and lauroyl peroxide); and carboxylic acids (e.g., thioglycolic acid, benzoic acid, acetic acid, formic acid, oxalic acid and maleic acid);

(c) inorganic oxidizing compounds, such as inorganic peroxides (e.g., hydrogen sodium peroxide and barium peroxide); halogen-oxoacid salts (e.g., hypochlorites, chlorites, chlorates and perchlorates); persulfates; permanganates; and nitrates (e.g., ammonium nitrate);

(d) inorganic reducing compounds, such as sulfides; nitrites, phosphites; sulfites; hydrides; and hydrazine; and (e) ammonia; metal hydroxides and basic or acidic metal salts, such as silicates, carbonates, phosphates and acetates of metallic elements belonging to the alkali elements (e.g., sodium and potassium), alkaline earth elements (e.g., magnesium, calcium and barium), zinc group elements (e.g., zinc), the third group elements (e.g., aluminum), the fourth group elements (e.g., lead), the fifth group elements (e.g., chromium), the seventh group elements (e.g., manganese), and the eighth group elements (e.g., iron).

When the coated surfaces are irradiated with light, the wavelength of the light is preferably in the ultraviolet range, while the intensity of the light or the irradiation time ranges from 50 to 500 W/m² and from 5 to 60 minutes, respectively. Such irradiation may be carried out in the presence of a photosensitizer conventionally employed in a photochemical process.

Among the various combinations of the above-mentioned compounds (A), (B) and (C), the most preferred combination consists of Sudan Black B as compound (A), Nigrosine as compound (B) and ethylenediamine or sodium silicate as compound (C).

When two or more of compounds (A) and/or (B) are used in accordance with the present invention, it is preferred that at least one of the compounds is oil soluble so that adsorptivity on the substrate is enhanced. In practicing the present invention, the compounds to be used as the coating material are dissolved or dispersed in a solvent capable of dissolving or dispersing all of the compounds. Suitable solvents are, for example, water, alcohols, esters, ketones, hydrocarbons, chlorinated hydrocarbons, and mixtures thereof.

The inner walls of the polymerization reactor and other surfaces coming into contact with the monomer or monomers are first coated with a solution or dispersion of compounds (A) and/or (B) in a solvent and then the coated and dried surfaces are subjected to treatment with compound (C). This treatment is conveniently carried out by introducing a solution of compound (C) (heated at 50° to 100° C for more than 10 minutes, into the polymerization reactor until a sufficiently high level is reached and then withdrawing the solution from the reactor, after which the polymerization process is carried out. When the polymerization process is carried out in an aqueous medium as in suspension or emulsion polymerization, the solution of compound (C) introduced into the reactor need not be withdrawn from the reactor. It may, therefore, be used as the dispersion medium of the polymerization mixture, into which the monomer or monomers and additives, such as polymerization initiators and dispersing agents are added. Compound (C) can also be effectively added to the polymerization mixture which has been charged into the polymerization reactor.

As a further embodiment of the method of the present invention, the inner walls of the reactor and other surfaces in contact with monomer are coated with a solution or dispersion of compounds (A) and/or (B) in a solvent which has been mixed with one or more compounds (C), followed by heating at 50° to 100° C for more than 10 minutes, or, alternatively or conjunctively, by irradiation with ultraviolet light. The coated surfaces are, if necessary, washed with water, to be ready for subsequent polymerization processes.

In accordance with the preferred embodiment of the present invention, compounds (A) and (B) are employed in combination to form the coating liquid. The ratio of compound (A) to compound (B) ranges from 1:5 to 5:1 by weight, and the amount of compound (C) is adjusted according to the above-described methods of treatment. When the treatment consists of heating a solution of compound (C) in the polymerization reactor, the amount of compound (C) used should be large, about 1 to 50 times by weight the total amount of compounds (A) and/or (B), since the effective concentration of compound (C) that is in contact with the coated surfaces is relatively low. However, when the treatment consists of adding compound (C) into the coating liquid of compounds (A) and/or (B), the amount of compound (C) used should be about 0.1 to 10 times by weight the total amount of compounds (A) and/or (B). The manner of use of compound (C) whether irradiation with ultraviolet light is used can be chosen by taking into consideration the combinations of compound (A) and/or (B). Regardless of the treatment, it should be carried out at an elevated temperature of from 50° to 100° C.

In order to satisfactorily prevent polymer scale deposition in accordance with the method of the present invention, the amount of compounds (A) and/or (B) used as coating materials must be at least 0.001 g of solids per square meter of the coated surface area.

In addition to coating or treating the surfaces of the reactor as described above, the prevention of polymer scale deposition can be further enhanced by the addition to the polymerization mixture of certain amounts of the obtained by the reaction of compounds (A) and/or (B) with compound (C) or by the irradiation of compounds (A) and/or (B) with ultraviolet light. Such amounts should be within the range of from a few p.p.m. to 100 p.p.m. by weight based on the weight of the monomer or monomers, taking into consideration that the quality of the resulting polymer products would be adversely effected by the presence of an excessive amount of the product.

The addition of certain alkaline substances to the polymerization mixture is also an effective means to further improve the effect of the present invention, especially when the polymerization is carried out in an aqueous medium where the pH value of the medium is to be higher than 8.0. Suitable alkaline substances include the oxides, hydroxides, carbonates, phosphates, hydrogencarbonates or silicates of ammonium, alkali metal elements and alkaline earth metal elements. The amount of the alkaline substance added is usually less than 1% by weight based on the monomer or monomers in order to avoid any adverse effects on the quality of the resulting products.

The method of the present invention is effective in any type of polymerization, including suspension polymerization, emulsion polymerization, solution polymerization and bulk polymerization. Further, the method of the invention is effective in preventing polymer scale deposition in the polymerization reactor regardless of kind of additives that are conventionally added to the polymerization mixture Examples of these additives are suspending agents, such as partially saponified polyvinyl alcohol and methyl cellulose anionic surface active, such as sodium laurylsulfate, sodium dodecylbenzensulfonate and sodium dioctylsulfosuccinate; nonionic surface active agents, such as sorbitan monolaurate and alkyl ethers of polyoxyalkylene; fillers, such as calcium carbonate and titanium dioxide; heat stabilizers, such as tribasic lead sulfate, dibutyltin dilaurate and various kinds of metallic soap; lubricants, such as rice wax and stearic acid; plasticizers, such as dioctyl phthalate, dibutyl phthalate and diallyl phthalte; chain transfer agents, such as trichloroethylene and mercaptans; pH controlling agents; and polymerization initiators, such as diisopropyl peroxydicarbonate, lauroyl peroxide and dimethylvaleronitrile.

Illustrative of the ethylenically unsaturated monomers to be polymerized in accordance with the method of the present invention are vinyl halides other than vinyl chloride; vinyl esters, such as vinyl acetate and vinyl propionate; acrylic and methacrylic acids and esters thereof; maleic and fumaric acids and esters thereof; maleic anhydride; diene monomers; such as butadiene, chloroprene and isoprene; unsaturated nitriles, such as acrylonitrile; aromatic vinyl monomers, such as styrene, vinylidene halides and vinyl ethers and monomer mixtures mainly composed of the above-mentioned monomers.

The method of the present invention is especially effective in preventing polymer scale deposition during free-radical polymerization in a heterogeneous phase; such as suspension polymerization, emulsion polymerizations and certain bulk polymerization in which the polymer precipitates in the polymerization mixture. The method is practical in the preparation of homo- or copolymers of a vinyl halide (other than vinyl chloride) or vinylidene halide (or a monomer mixture composed principally thereof) by suspension or emulsion polymerization, polymer beads or latex of polystrene, polymethylmethacrylate and polyacrylonitrile, synthetic rubbers, such as SBR, NBR, CR, IR AND IIR, usually by emulsion polymerization, and ABS resins.

The following examples illustrate the method of the present invention in further detail.

EXAMPLE 1

Solutions were prepared by dissolving Sudan Black B as an organic electron/donor compound (A) and/or Nigrosine as an organic electron/acceptor compound (B) in a solvent (either methanol or ethanol). The total amount of compounds A and B used represented 1% by weight of the solution. The relative amounts of compounds A & B used are set forth in Table I.

Each solution was subjected to treatment consisting of the addition of a compound selected from the aforementioned group of compounds (C), the resulting mixture being heated, or irradiated with ultraviolet light, to produce a coating liquid. The choice of compound (C), the amount used, the heating temperature and time, or the irradiation temperature and time are indicated in the table under the heading "Conditions of Treatment". Each of the coating liquids thus obtained was applied over the inner walls of a 1,000-liter stainless steel polymerization reactor and the surfaces of a paddle-type agitator installed in the reactor in an amount of 0.10 g/m² of solids, followed by drying at 50° C to remove the solvent and then washing with water.

Into each of the polymerization reactors thus coated were introduced 0.45 kg of tert-dodecylmercaptan, 11.3 kg of rosin soap, 1.5 kg of sodium phosphate decahydrate, 0.075 kg of iron (I) sulfate heptahydrate, 0.13 kg of tetrasodium ethylenediaminetetraacetate, 0.20 kg of sodium formaldehydesulfoxylate and 500 kg of deionized water. After the air in each polymerization reactor was evacuated and it was filled with nitrogen gas, 0.23 kg of diisopropylbenzene monohydroperoxide, 73 kg of styrene and 177 kg of butadiene were put into the reactor, followed by polymerization at 5° C for 9 hours. A styrene-butadiene rubber latex was produced in a 60% yield.

The amounts of the polymer scale deposited on the reactor walls were determined, with the results as set forth in Table I.

TABLE I

| Exp. No. | Compound (A) | Compound (B) | Solvent** | Conditions of Treatment | Scale Deposited, g/sq.m |
|---|---|---|---|---|---|
| 1* | — | — | — | Not treated | 2,500 |
| 2* | 100 | 0 | Meth. | " | 1,000 |
| 3* | 0 | 100 | Meth. | " | 1,500 |
| 4* | 100 | 100 | Meth. | " | 800 |
| 5 | 100 | 0 | Meth. | Ethylenediamine 100; 90° C, 30 min. | 200 |
| 6 | 0 | 100 | Meth. | " | 300 |
| 7 | 100 | 100 | Meth. | " | 0 |
| 8 | 100 | 100 | Meth. | Ethylenediamine 100; 60° C, 30 min. | 10 |
| 9* | 100 | 100 | Meth. | No addition, but heated 90° C, 30 min. | 500 |
| 10 | 100 | 100 | Meth. | Irradiated, 55° C, 30 min. | 0 |
| 11 | 100 | 100 | Eth. | Sodium silicate 100; 90° C, 30 min. | 0 |
| 12 | 100 | 100 | Eth. | Phenol 100; 90° C 30 min. | 0 |
| 13 | 100 | 100 | Eth. | Ammonium nitrate 100; 90° C, 30 min. | 0 |
| 14 | 100 | 100 | Eth. | Ethanolamine 100; 90° C, 30 min. | 0 |
| 15 | 100 | 100 | Eth. | Rongalit 100; 90° C, 30 min. | 0 |
| 16 | 100 | 20 | Eth. | " | 20 |
| 17 | 100 | 50 | Eth. | " | 0 |
| 18 | 20 | 100 | Eth. | " | 50 |
| 19 | 50 | 100 | Eth. | " | 0 |
| 20 | 100 | 100 | Eth. | Ethylenediamine 10; 90° C, 30 min. | 30 |
| 21 | 100 | 100 | Eth. | Ethylenediamine 500; 90° C, 30 min | 0 |

*Control.
**Meth. is methanol. Eth. is ethanol.

EXAMPLE 2

1% by weight solutions prepared by dissolving the various organic electron/donor compounds (A) and/or organic electron/acceptor compounds (B), as indicated in Table II. A concentration of 1% by weight of the total of compounds (A) and (B) in the various solvents set forth in the table, was used. Each compound (A) or (B) was present in a relative amount of 100 parts and each of the compounds (A) or (B) used in combination had a relative amount of 50.

Each solution was subjected to treatment by the addition of a compound selected from the aforementioned group of compounds (C), as indicated in the table, in a relative amount of 100 parts. The resulting mixture was treated at 90° C for a period of 30 minutes, to produce a coating liquid. Each of the coating liquids thus obtained was applied over the inner walls of a 100-liter stainless steel polymerization reactor and the surfaces of a paddle-type agitator installed in the reactor in an amount of 0.10 g/m² of solids, followed by drying and then washing with water.

Into each of the polymerization reactors thus coated were introduced 34 kg of vinylidene chloride, 6 kg of vinyl chloride, 0.30 kg of lauroyl peroxide, 0.08 kg of gelatin, 0.04 kg of methyl cellulose, 0.30 kg of glycidyl phenyl ether, 0.22 kg of sodium pyrophosphate and 52 kg of deionized water, followed by suspension polymerization conducted at 60° C until the pressure inside the reactor decreased to 3.8 kg/cm²G. At this point, the deposition of polymer scale was examined. The results are shown in Table II.

TABLE II

| Exp. No. | Compound (A) | Compound (B) | Solvent** | Conditions of Treatment | Scale Deposited, g/sq.m |
|---|---|---|---|---|---|
| 22* | Nigrosine Base | — | (a) | Not treated. | 350 |
| 23* | Diaminonaphthalene | — | (b) | " | 400 |
| 24* | — | Oil Scarlet 308 | (b) | " | 300 |
| 25* | — | Anthraquinone sulfonic acid | (b) | " | 500 |
| 26 | Nigrosine Base | Nigrosine | (b) | Pyridine | 0 |
| 27 | " | Amaranth | (b) | " | 0 |
| 28 | " | Oil Red RR | (c) | Sodium silicate | 10 |
| 29 | Diaminonaphthalene | (d) | Thiophenol | 0 |
| 30 | Bismarck Brown R | Oil Scarlet 308 | (b) | p-Benzoquinone | 0 |
| 31 | Bismarck Brown/ Nigrosine Base | Indanthrene | (b) | " | 0 |
| 32 | Sudan Black B | Anthraquinone sulfonic acid | (b) | Epichlorohydrin | 0 |
| 33 | Spirit Black | Direct Brown | (b) | Picrylazide | 0 |
| 34 | Azulene | Acid Light Yellow | (b) | 8-Hydroquinoline | 0 |
| 35 | Dibenzophenothiazine | Direct Blue | (b) | Sodium methoxide | 0 |
| 36 | Nile Blue A | Phytic acid | (b) | Ethylamine | 0 |
| 37 | Malachite Green | Anthraquinone | (e) | Sodium hydroxide | 0 |
| 38 | Oil Scarlet SN | Pentaerithritol/ Naphthol Yellow | (b) | Idole | 0 |
| 39 | " | Rhodamine Base | (b) | " | 0 |
| 40 | Diphenylene oxide | Oil Red SA | (b) | Chloranil | 0 |
| 41* | | No coating | | | 700 |

*Control.
**Solvent (a) stands for a mixture of toluene and methanol (1:1); (b) stands for methanol; (c) stands for methylene chloride; (d) stands for ethanol; and (e) stands for a mixture of methylene chloride and methanol (1:1).

EXAMPLE 3

1% by weight solutions were prepared by dissolving Sudan Black B as the organic electron donor compound (A) and/or Nigrosine as the organic electron acceptor compound (B) in methanol. The relative amounts compounds (A) and (B) employed are indicated in Table III.

Each solution thus prepared was applied on the inner walls of a 100-liter stainless steel polymerization reactor. Then, a mixture of 26 kg of deionized water and the relevant amount of morpholine as component (C), as indicated in the table, was introduced into the polymerization reactor in a shower over the coated wall surfaces. The wall surfaces were then heated at the temperature of 90° C or 50° C, also as indicated in the table, for 30 minutes.

Then, suspension polymerization was conducted in the same manner and with the same monomers and constituents used in Example 2, except that amount of deionized water was 26 kg. The amount of polymer scale that deposited on the walls was determined, with the results as shown in Table III.

TABLE III

| Exp. No. | Compound (A) | Compound (B) | Compound (C) | Heating Temperature | Scale Deposited, g/sq. m |
|---|---|---|---|---|---|
| 42 | 100 | 0 | 10 | 90° C | 150 |
| 43 | 0 | 100 | 10 | 90° C | 650 |
| 44 | 100 | 100 | 10 | 50° C | 150 |
| 45 | 100 | 100 | 10 | 90° C | 0 |
| 46 | 100 | 5 | 10 | 90° C | 30 |
| 47 | 100 | 20 | 10 | 90° C | 15 |
| 48 | 100 | 50 | 10 | 90° C | 0 |
| 49 | 2 | 100 | 10 | 90° C | 600 |
| 50 | 20 | 100 | 10 | 90° C | 20 |
| 51 | 50 | 100 | 10 | 90° C | 0 |
| 52 | 100 | 100 | 2 | 90° C | 50 |
| 53 | 100 | 100 | 50 | 90° C | 0 |

EXAMPLE 4

1% by weight solutions were prepared by dissolving the various organic electron donor compounds (A) and organic electron acceptor compounds (B), as indicated in Table IV, in methanol, each compound being used in a relative amount of 100 parts.

Using these solutions, the inner wall surfaces of a 100-liter stainless steel polymerization reactor were coated and treated in accordance with the same procedures used in Example 3; except that the compounds (C) used were as indicated in the table in a relative amount of 10 parts and the heating temperature was 90° C, followed by suspension polymerization in accordance with Example 3. The results of polymer scale desposition are shown in Table IV.

TABLE IV

| Exp. No. | Compound (A) | Compound (B) | Compound (C) | Scale Deposited, g/sq. m |
|---|---|---|---|---|
| 54 | Oil Yellow | Milling Black VLG | Pyrimidine | 0 |
| 55 | Induline | α-Naphthol Orange | Potassium chlorate | 0 |
| 56 | Spirit Black | Acid Brown RX | Sodium-hydrogen-carbonate | 0 |
| 57 | Oil Blue A | Alizarine | Pyrogallol | 0 |

EXAMPLE 5

A 1% by weight methanolic solution was prepared by dissolving Sudan Black B as the electron donor compound (A) and Nigrosine as the electron acceptor compound (B) in the proportion of 100 to 50 parts by weight followed by heat treatment at 90° C for 30 minutes with addition of ethylenediamine as compound (C) in a relative amount of 100 parts.

The solution was applied on the inner walls of a 2-liter stainless steel polymerization reactor and then, into this reactor was introduced 900 g of a 2% aqueous solution of polyvinyl alcohol and 0.2 g of potassium persulfate, followed by polymerization with 600 g of vinyl acetate dropped over a period of 3 hours at 65° C, consequently with heating for an additional 2 hours at the same temperature. Polymer scale deposited on the reactor walls amounted to 2 g as a whole.

A comparative experiment was conducted in and under the same manner and conditions as above except that the coating of the reactor walls was omitted. As a result, the amount of polymer scale deposited on the reactor walls was 23 g as a whole.

EXAMPLE 6

Using the same solution as prepared in Example 5, the inner walls of a 200-liter stainless steel polymerization reactor were coated.

Into the polymerization reactor thus coated were introduced 20 kg of a latex of SBR composed of 23.5% styrene and 76.5% butadiene, containing 0.5% gel fraction and 23.5% of solids, all by weight, in which latex sodium formaldehydesulfoxylate had been dissolved in an amount of 2.51 g per 560 liters of the latex, followed by heating to 80° C. Then 70 kg of methyl methacrylate containing 1% cumene hydroperoxide was dropped into the reactor over a period of 2 hours. 1 hour after the end of the above dropping, another dropping of 70 kg of styrene containing 1% cumene hydroperoxide dissolved therein was carried out over a period of 2 hours, followed by polymerization by keeping the mixture at the same temperature (80° C) for about 1 hour. The amount of the polymer scale deposited on the walls was 30 g/m².

For comparison, the same procedure was repeated, but without the coating of the reactor walls. The amount of polymer scale deposition was 1,200 g/m².

EXAMPLE 7

Using the solution of Experiment No. 21, the inner walls of a 50-liter stainless steel reactor were coated. Into the thus coated polymerization reactor was charged a mixture consisting of 16 kg of styrene, 15 kg of deionized water, 0.24 kg of sodium stearate, 0.03 kg of sodium pyrophosphate and 0.028 kg of potassium persulfate. The pH of the mixture was adjusted to 10.5 by the use of sodium hydroxide, and subjected to polymerization with stirring at 60° C for 10 hours. After the polymerization, the reactor was washed with water, and it was formed that no polymer scale had deposited on the inner walls.

For comparison, a similar procedure was repeated with a polymerization reactor whose inner wall surfaces were not coated. The amount of polymer scale deposition was 30 g/m².

EXAMPLE 8

Using the solution of Experiment No. 53, the inner walls of a 50-liter stainless steel reactor were coated. Into the coated polymerization reactor was charged a mixture consisting of 15 kg of methylmethacrylate, 30 kg of deionized water, 0.01 kg of hydroxypropyl methylcellulose and 0.0045 kg of diisopropylperoxydicarbonate. The mixture was subjected to polymerization with stirring at 50° C for 10 hours. After the polymerization, the reactor was washed with water, and it was found that no polymer scale had deposited on the inner walls.

For comparison, a similar procedure was repeated with the polymerization reactor whose inner wall surfaces were not coated. The amount of polymer scale deposition was 25 g/m².

EXAMPLE 9

Using the solution of Experiment No. 29, the inner walls of a 50-liter stainless steel reactor were coated. Into the coated polymerization reactor was charged a mixture consisting of 10 kg of acrylonitrile, 30 kg of deionized water, 1.5 kg of zinc chloride and 0.01 kg of α,α'-azobisdimethylvaleronitrile. The mixture was subjected to polymerization with stirring at 50° C for 10 hours. After the polymerization, the reactor was washed with water, and it was observed that no polymer scale had deposited on the inner walls.

For comparison, a similar procedure was repeated with a polymerization reactor whose inner wall surfaces were not coated. The amount of polymer scale deposition was 18 g/m².

What is claimed is:

1. In a method for polymerizing at least one ethylenically unsaturated monomer other than vinyl chloride in a heterogeneous phase, the improvement comprising coating, prior to the introduction of a polymerization mixture into a polymerization reactor, the surface coming into contact with the monomer with a reaction product produced by reacting at least one compound selected from group (A) consisting of aromatic polycyclic hydrocarbons, polyene compounds having more than two double bonds, amine compounds, thiazine compounds, thiazole compounds, sulfides, oxazine compounds, basic quinoneimine dyes, triphenylmethane dyes, diphenylmethane dyes, xanthene dyes, thiazole dyes, phthalocyanine dyes, cyanine dyes, higher aliphatic mercaptans, higher aliphatic thioesters, polysulfides, ethers, and group (B) consisting of quinone compounds, organic sulfonic acids and salts thereof, halogen-substituted aromatic polycyclic compounds, carboxylic acids and salts or anhydrides thereof, organic nitro compounds, organic cyano compounds, esters of phosphoric and polyphosphoric acids and salts thereof, acid azo dyes, acid mordant dyes, direct azo dyes, anthraquinone mordant dyes, acid anthraquinone dyes, anthraquinone vat dyes, naphthoquinone or benzoquinone vat dyes, indigozol or anthrasol dyes, indigo dyes, nitro dyes, nitroso dyes, sulfide dyes, acid triphenylmethane dyes, acid quinonemine dyes, oil-soluble azo dyes, oil-soluble xanthene dyes, reactive dyes, and quinoline dyes, with a compound selected from group (C) consisting of aromatic nitro compounds, p-benzoquinone and substituted benzoquinone compounds, organic peroxides, inorganic peroxides, halogeno-oxoacid salts, persulfates, permanganates, nitrates, amine compounds, sulfur-containing organic compounds, reducing carbohydrates, aldehydes, ethers, phenolic compounds, inorganic sulfides, nitrites, phosphites, sulfites, hydrides, hydrazine, ammonia, metal hydroxides, and basic metal salts, at a temperature of between about 50° C and 100° C for more than 10 minutes.

2. The method as claimed in claim 1 wherein said reaction product is added to the polymerization mixture in an amount of from 5 to 100 p.p.m. by weight based on the monomer.

3. The method as claimed in claim 1 wherein the contact of compounds (A) and (B) with compound (C) is carried out by putting an aqueous solution or dispersion of compound (C) into the polymerization reactor whose inner wall surfaces have previously been coated with compounds (A) and (B).

4. The method as claimed in claim 1 wherein said compound (A) is Sudan Black B and said compound (B) is Nigrosine, both compounds being employed in combination as a mixture, and said compound (C) is ethylenediamine.

5. The method as claimed in claim 1 wherein said compound (A) is Sudan Black B and said compound (B) is Nigrosine, both compounds being employed in combination as a mixture, and said compound (C) is sodium silicate.

6. The method as claimed in claim 1 wherein at least one of compounds (A) or (B) employed is oil-soluble.

7. The method as claimed in claim 1 wherein the coating is carried out, using a solution of compounds (A) and (B) in an organic solvent.

8. The method as claimed in claim 3 wherein the aqueous solution or dispersion of compound (C) put in the polymerization reactor is re-used for a subsequent polymerization.

9. The method as claimed in claim 1 wherein compound (A) and compound (B) are employed in combination as a mixture in a ratio ranging from 1:5 to 5:1 by weight.

10. The method as claimed in claim 3 wherein the amount of compound (C) ranges from 1 to 50 times by weight the total amount of compounds (A) and (B).

11. The method as claimed in claim 1 wherein the amount of compound (C) ranges from 0.1 to 10 times by weight the total amount of compounds (A) and (B).

12. The method as claimed in claim 1 wherein the coating amount is at least 0.001 g as solid per square meter of the coated surface.

13. The method as claimed in claim 1 wherein the polymerization is carried out in an aqueous medium having a pH value higher than 8.0.

* * * * *